United States Patent Office 2,877,215
Patented Mar. 10, 1959

2,877,215

REACTION PRODUCT OF PHOSPHORIC ACID WITH A DIOXOLANE ESTER-ETHYLENICALLY UNSATURATED MONOMER COPOLYMER AND PROCESS FOR MAKING SAME

James C. Fang, Sharon Hill, Pa., assignor to E. I. du Pont de Nemours and Company, Wilmington, Del., a corporation of Delaware No Drawing. Application August 10, 1956
Serial No. 603,218

12 Claims. (Cl. 260—86.1)

This invention relates to new phosphated copolymers, to their preparation, and to liquid coating compositions containing them.

The new phosphated copolymers of this invention are the reaction products of (A) phosphoric acid with (B) a copolymer of (1) a substituted dioxolane ester having the empirical formula

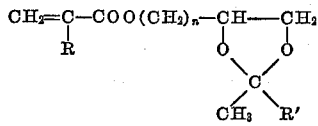

in which $n$ is an integer having a value of 1–4 inclusive, R is H or $CH_3$, and R' is $CH_3$ or $C_2H_5$, and (2) a polymerizable ethylenically unsaturated monomer of the group consisting of styrene, $C_1$–$C_4$ alkyl esters of acrylic acid, and $C_1$–$C_4$ alkyl esters of methacrylic acid, the molar ratio of (1) to (2) in said copolymer being between 2:98 and 50:50, and the amount of phosphoric acid being 0.5–1.5 mols per mol of said substituted dioxolane ester in said copolymer.

Compounds having the empirical formula given above are the acrylic or methacrylic acid esters of certain 4-hydroxyalkyl-2,2-dialkyl-1,3-dioxolanes. The substituted dioxolanes are easily prepared by reacting an alpha, beta, omega trihydroxyalkane having 3 to 6 carbon atoms in the alkane chain (i. e. glycerol to hexane triol) with acetone or methyl ethyl ketone following the principles disclosed in J. Org. Chem., vol. 14 (1949), p. 1103, and J. Am. Chem. Soc., vol. 67 (1945), p. 1621. The polymerizable monomeric acrylic and methacrylic acid esters of these compounds are easily prepared by reacting the substituted dioxanes with the appropriate acid or, preferably, with a lower alkyl ester thereof.

The resulting esters are subsequently copolymerized with selected vinyl monomers to yield the copolymers which in turn are reacted with phosphoric acid to produce the new phosphated polymers of this invention. Analysis of the products indicates that the reaction with phosphoric acid takes the following course predominantly:

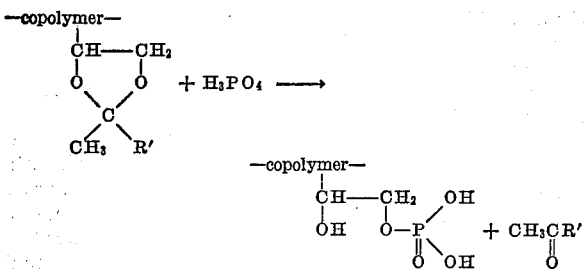

The reaction with phosphoric acid is carried out with the copolymer in solution, preferably in an inert solvent, i. e. one which is substantially free of ketone, aldehyde or other structures which are susceptible to reaction at the same point in the opened dioxolane ring as the phosphoric acid, thus interfering with completion of the reaction in the desired direction. Further, the reaction with phosphoric acid is carried out most easily at atmospheric pressure and at 110°–130° C., i. e. a temperature substantially above the boiling point of the by-product ketone. Sub- and super-atmospheric pressures can be used if desired, provided that the temperature is high enough so that the by-product ketone can be distilled from the reaction mixture.

The liquid coating compositions of this invention contain the new phosphated copolymers as the principal film-forming material dissolved in a suitable solvent or solvent mixture. Minor proportions of other compatible organic film-forming materials, such as urea or melamine formaldehyde resins, can also be included, as well as other conventional ingredients such as catalysts, inhibitors, surface active agents, plasticizers and pigments.

The following examples illustrate the practice of this invention, but it is not limited thereby. Unless otherwise specified, the parts and percentages are by weight.

EXAMPLE 1

*Preparation of 4-methacryloxymethyl-2-ethyl-2-methyl-1,3-dioxolane*

132 parts by weight of dry 4-hydroxymethyl-2-ethyl-2-methyl-1,3 dioxolane having the formula

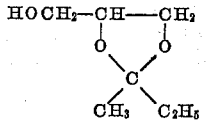

and 500 parts of dry methyl methacrylate are placed in a distilling flask with 2 parts of hydroquinone. The flask is fitted with a thermometer, an agitator and a reflux condenser with distillation head. 14 parts of a catalyst mixture containing 2 parts of metallic sodium and 40 parts of methanol are added, the atmosphere in the vessel is displaced by nitrogen and the charge is heated to reflux temperature (vapor temperature 64° C.). Refluxing is continued for about an hour, when another 14 parts of catalyst mixture are added. After another 90 minutes of refluxing, a final 14 parts of catalyst mixture are added, and refluxing is continued for 2 more hours. Upon cooling to room temperature the charge is neutralized with 20 parts of solid carbon dioxide and is washed twice with 10% aqueous sodium chloride solution. The aqueous layer is separated and the organic layer is dried by adding anhydrous magnesium sulfate. After filtering, 2 parts of hydroquinone are added and the charge is fractionally distilled under vacuum. The portion collected at 85° C. and 1 mm. Hg (96 parts by weight) is retained and by analysis is found to be substantially pure 4-methacryloxymethyl-2-ethyl-2-methyl-1,3-dioxolane,

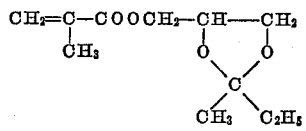

*Preparation of copolymer of styrene and 4-methacryloxy-methyl-2-ethyl-2-methyl-1,3-dioxolane*

85 parts by weight of styrene, 22.6 parts of the substituted dioxolane ester prepared immediately above, 2 parts of alpha, alpha' azobisisobutyronitrile catalyst and 107.6 parts of xylene are placed in a glass polymerization vessel. The atmosphere therein is replaced with nitrogen. The vessel is sealed and is tumbled in a water bath at about 80° C. for 35 hours, during which 102.8 parts of copolymer is produced as a 47.8% solids solution in xylene.

*Preparation of phosphated copolymer and clear coating composition*

217 parts by weight of the copolymer solution produced above, 50 parts of xylene used to rinse the polymerization vessel, 10.3 parts of aqueous 85% orthophosphoric acid and 40 parts of butanol are placed in a reaction flask equipped with a thermometer, agitator and reflux condenser with take-off head. Heat is applied and 81 parts of distillate are removed while the temperature of the charge rises to 130° C. (vapor 121° C.). At this point refluxing is started and is continued at about 130° C. for 40 minutes. Heating is discontinued, the charge is cooled, and 40 parts of butanol and 41 parts of xylene are mixed with it. The resulting solution is clear and yellowish in color. It contains 36.6% by weight of a copolymer of styrene and 4-methacryloxymethyl-2-ethyl-2-methyl-1,3-dioxolane in the molar proportion of 88.5:11.5, this copolymer being phosphated with phosphoric acid in the amount of 0.88 mol of acid per mol of the substituted dioxolane.

This solution is useful as a clear coating composition without further modification. A coating thereof, on steel for example, is baked for 20 minutes at 350° F. and yields a hard, adherent, flexible and durable coating.

*Preparation of pigmented coating composition*

220 parts by weight of the phosphated copolymer solution prepared immediately above and 65 parts of titanium dioxide pigment are ground in conventional paint grinding apparatus until a smooth dispersion results. To this is added 90 parts of xylene and 10 parts of butanol to thin the resulting coating composition to spraying consistency.

The product is sprayed on a set of suitably primed steel panels to provide dry coatings about 1 mil thick. The panels are baked for 30 minutes at 300° F. and upon cooling are subjected to tests to determine flexibility, hardness, gloss, chipping resistance, soap resistance, detergent resistance, and impact resistance in comparison with a commercially acceptable washing machine enamel. In all of these properties, the new product of this example is satisfactory. It is superior to the commercial product in hardness, chipping resistance, soap resistance and detergent resistance.

It is to be understood that the clear and pigmented coating compositions of this example are useful generally as baking-type finishes and that their utility is not limited to the illustrative use to which they are put in this example.

Titanium dioxide is used in this example merely as one species of the wide variety of pigments which are commonly used in liquid coating compositions and which are useful in this invention. Others include metal oxides, hydroxides, sulfides, sulfates, silicates and chromates, organic colors, carbon blacks, and naturally occurring minerals such as china clay. Such other pigments can be used alone or in admixture and in the same or different amounts than the titanium dioxide used above, in accordance with pigmentation principles commonly employed in the organic coating art.

EXAMPLE 2

The procedure of Example 1 is repeated in producing four additional phosphated copolymers of this invention and the corresponding clear and pigmented coating compositions, the only substantial change being that four different molar ratios of phosphoric acid to the 4-methacryloxymethyl-2-ethyl-2-methyl-1,3-dioxolane in the copolymer are used in the phosphation step, namely 0.5 to 1, 0.75 to 1, 1 to 1, and 1.5 to 1.

In general coatings of these products have properties similar to each other and to the products of Example 1. Coatings of the products made with the 0.5 to 1 ratio of phosphoric acid to substituted dioxolane ester have somewhat higher gloss and somewhat less resistance to soap and detergent. The products made with the 1.5 to 1 ratio of phosphoric acid to substituted dioxolane ester are sufficiently acidic to change the color of highly acid-sensitive colored pigments.

EXAMPLE 3

The procedure of Example 1 is repeated, substituting an equimolar amount of 4-methacryloxymethyl-2,2-dimethyl-1,3-dioxolane for the 4-methacryloxymethyl-2-ethyl-2-methyl-1,3-dioxolane. The resulting phosphated copolymer and the clear and pigmented coating compositions have properties substantially equal to the products of Example 1.

EXAMPLE 4

A copolymer is prepared by polymerizing 95 parts by weight (0.95 mol) of methyl methacrylate and 10 parts by weight (0.05 mol) of 4-acryloxymethyl-2-ethyl-2-methyl-1,3-dioxolane in the presence of 2 parts of benzoyl peroxide and 105 parts of xylene at 85° C. by the procedure used in Example 1. The resulting copolymer is reacted with 1 mol of phosphoric acid per mol of substituted dioxolane ester as in Example 1. Clear and pigmented coating compositions containing the resulting phosphated copolymer are similar to the products of Example 1, but are somewhat harder and somewhat less resistant to soap and detergent. They are particularly useful as primers or undercoats where a different coating composition is applied thereover.

Other $C_1$–$C_4$ alkyl esters of acrylic or methacrylic acid can be substituted for the methyl methacrylate used in this example. The same or different molar proportions can be used.

EXAMPLE 5

4-(4-methacryloxybutyl)-2-ethyl-2-methyl-1,3-dioxolane

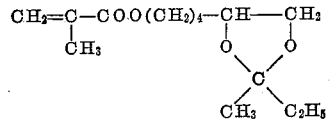

is prepared as follows: 402 parts by weight of hexane-1,2,6-triol, 432 parts of methyl ethyl ketone, 1000 parts of toluene and 20 parts of para-toluene sulfonic acid are placed in a reaction flask equipped with a thermometer, agitator, and condenser with water trap. The charge is refluxed for about 6 hours at 95°–109° C. during which 61 parts of water are removed. Then a mixture of 258 parts of glacial methacrylic acid and 10 parts of hydroquinone is added dropwise to the charge during a period of 4 hours while maintaining reflux conditions (temperature about 109° C.). Refluxing is continued until water removal is substantially complete; in this case 52 parts of water are collected.

The charge is then cooled, filtered, neutralized with sodium acetate, and filtered again. Then the charge is fractionally distilled under vacuum. The portion (438 parts by weight) collected between 120° C. at 1.2 mm. Hg and 129° C. at 0.6 mm. Hg is retained as a concentrate of the desired substituted dioxolane ester.

A copolymer containing this ester and styrene in the molar ratio of 40:60 is prepared by placing 105 parts by weight of this ester, 62.4 parts of styrene, 1.5 parts of alpha, alpha' azobisisobutyronitrile catalyst and 168 parts of toluene in a polymerization vessel, flushing it with nitrogen sealing it and tumbling it for about 16 hours in a water bath at 85° C. 46 parts by weight of aqueous 85% phosphoric acid (1 mol per mol of the substituted dioxolane ester in the copolymer), 16 parts of butanol and 48 parts of methyl ethyl ketone are added to this solution and the resulting mixture is heated for 1 hour at about 85° C.

The resulting phosphated copolymer solution is useful as the source of the principal organic film-forming material in clear and pigmented coating compositions.

For reasons of cost, ease of manufacture and desirable balance of properties, products derived from styrene are preferred products of this invention, as are those containing in the copolymer 5–20 mol percent of substituted dioxolane ester, and those in which 0.85–1.1 mols of phosphoric acid are used for each mol of substituted dioxolane ester in the copolymer.

The phosphated copolymers of this invention are converted by heat to a condition in which they are insoluble in the common organic liquids that dissolve the phosphated copolymers. In the principal use of these products, i. e. as coating compositions, the article to be protected, insulated, and/or decorated therewith is coated or impregnated with the liquid coating composition and is then baked until cured, preferably at a temperature above 300° C. The coating compositions of this invention can be applied to any article which will stand the baking step, e. g. metals, ceramics, heat-resistant fabrics, wires and the like. They are particularly useful for protecting and decorating household appliances such as food-mixers, refrigerators, clothes washers, and kitchen cabinets.

Many widely different embodiments of this invention can be made without departing from the spirit and scope thereof. Therefore it is not intended to be limited except as defined in the appended claims.

I claim:

1. The polymeric reaction product of (A) phosphoric acid and (B) a preformed copolymer of (1) a substituted dioxolane ester having the empirical formula

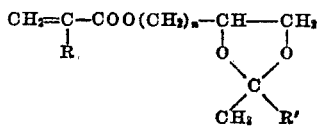

in which $n$ is an integer having a value of 1–4 inclusive, R is a member of the group consisting of H and $CH_3$, and R' is a member of the group consisting of $CH_3$ and $C_2H_5$, and (2) a polymerizable monomer of the group consisting of styrene, $C_1$–$C_4$ alkyl esters of acrylic acid and $C_1$–$C_4$ alkyl esters of methacrylic acid, the molar ratio of (1) to (2) in said copolymer being between 2:98 and 50:50, and the amount of phosphoric acid being 0.5–1.5 mols per mol of said substituted dioxolane ester in said copolymer.

2. A product of claim 1 in which said substituted dioxolane ester is 4-methacryloxymethyl-2-ethyl-2-methyl-1,3-dioxolane.

3. A product of claim 1 in which said substituted dioxolane ester is 4-methacryloxymethyl-2,2-dimethyl-1,3-dioxolane.

4. A product of claim 1 in which said substituted dioxolane ester is 4-acryloxymethyl-2-ethyl-2-methyl-1,3-dioxolane.

5. A product of claim 1 in which said substituted dioxolane ester is 4-(4-methacryloxybutyl)-2-ethyl-2-methyl-1,3-dioxolane.

6. A product of claim 1 in which said polymerizable monomer is styrene.

7. A product of claim 1 in which said polymerizable monomer is methyl methacrylate.

8. A product of claim 1 in which the molar ratio of said substituted dioxolane ester to said polymerizable monomer is between 5:95 and 20:80.

9. A product of claim 1 in which the amount of phosphoric acid is 0.85–1.1 mols per mol of said substituted dioxolane ester in said copolymer.

10. A clear liquid coating composition comprising a product of claim 1 as the principal film-forming component, and volatile solvent therefor.

11. A liquid coating composition comprising a product of claim 1 as the principal film-forming component, volatile solvent therefor, and pigment.

12. The process of preparing a phosphated copolymer which comprises reacting (A) phosphoric acid and (B) a preformed copolymer of (1) a substituted dioxolane ester having the empirical formula

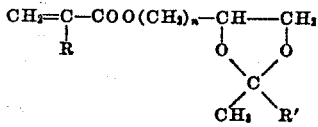

in which $n$ is an integer having a value of 1–4 inclusive, R is a member of the group consisting of H and $CH_3$, and R' is a member of the group consisting of $CH_3$ and $C_2H_5$, and (2) a polymerizable monomer of the group consisting of styrene, $C_1$–$C_4$ alkyl esters of acrylic acid and $C_1$–$C_4$ alkyl esters of methacrylic acid, the molar ratio of (1) to (2) in said copolymer being between 2:98 and 50:50, and the amount of phosphoric acid being 0.5–1.5 mols per mol of said substituted dioxolane ester in said copolymer, in the presence of a liquid organic solvent at a temperature above the boiling point of the by-product compound

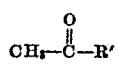

and removing said by-product from the reaction mixture.

References Cited in the file of this patent

UNITED STATES PATENTS

| | | |
|---|---|---|
| 2,601,572 | Thomas et al. | June 24, 1952 |
| 2,680,735 | Fegley et al. | June 8, 1954 |
| 2,692,876 | Cupery | Oct. 26, 1954 |